United States Patent
Kawazu

(10) Patent No.: US 12,316,818 B2
(45) Date of Patent: May 27, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Ayuta Kawazu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/489,462

(22) Filed: Sep. 29, 2021

(65) Prior Publication Data

US 2022/0021788 A1 Jan. 20, 2022

Related U.S. Application Data

(63) Continuation of application No. 16/909,893, filed on Jun. 23, 2020, now Pat. No. 11,272,075.

(30) Foreign Application Priority Data

Jun. 27, 2019 (JP) .................................. 2019-120324

(51) Int. Cl.
 *G06F 21/50* (2013.01)
 *G06F 21/51* (2013.01)
 (Continued)

(52) U.S. Cl.
 CPC ........... *H04N 1/4426* (2013.01); *G06F 21/52* (2013.01); *G06F 21/608* (2013.01);
 (Continued)

(58) Field of Classification Search
 USPC ....... 358/1.1–3.29, 1.11–1.18; 713/100–194, 713/375; 719/311–322, 310; 726/1–35
 See application file for complete search history.

(56) References Cited

U.S. PATENT DOCUMENTS

| 8,364,950 B1* | 1/2013 | Osburn, III | ......... H04L 63/0428 713/153 |
| 2005/0066165 A1* | 3/2005 | Peled | .................. G06F 21/6245 713/165 |

(Continued)

FOREIGN PATENT DOCUMENTS

| JP | 2006053787 A | 2/2006 |
| JP | 2018136811 A | 8/2018 |

OTHER PUBLICATIONS

EP 2164017;Hanna Stephen R; Automatic Hardware-based Recovery of a Compromised Computer; Mar. 17, 2010 (Year: 2010).*

(Continued)

*Primary Examiner* — Marcellus J Augustin
(74) *Attorney, Agent, or Firm* — Canon U.S.A., Inc. IP Division

(57) ABSTRACT

An information processing apparatus includes a request reception unit configured to receive a request for executing an execution module, a first alteration detection unit configured to detect an alteration of a white list upon reception of the execution request, a second alteration detection unit configured to detect an alteration of an execution module which has issued the execution request, by using a white list determined to have no alteration by the first alteration detection unit, and an error control unit configured to, upon detection of an alteration by the second alteration detection unit, select and control whether to deactivate a system of the information processing apparatus or to inhibit only execution of the execution module which has issued the execution request, depending on a current activation mode of the information processing apparatus and an activation mode using the execution module which has issued the execution request.

14 Claims, 14 Drawing Sheets

(51) Int. Cl.
*G06F 21/52* (2013.01)
*G06F 21/55* (2013.01)
*G06F 21/57* (2013.01)
*G06F 21/60* (2013.01)
*H04L 9/32* (2006.01)
*H04N 1/44* (2006.01)
*H04N 1/00* (2006.01)

(52) U.S. Cl.
CPC ......... *H04L 9/3247* (2013.01); *H04N 1/4433* (2013.01); *G06F 2221/032* (2013.01); *H04N 1/0048* (2013.01)

(56) References Cited

U.S. PATENT DOCUMENTS

| | | | |
|---|---|---|---|
| 2006/0069649 A1* | 3/2006 | Morten | G06F 21/50 348/E7.056 |
| 2009/0038009 A1* | 2/2009 | Haishima | G07F 17/32 726/22 |
| 2013/0247177 A1* | 9/2013 | Park | G06F 21/44 726/21 |
| 2015/0235028 A1* | 8/2015 | Tsuchitoi | G06F 21/572 713/187 |
| 2016/0285717 A1* | 9/2016 | Kim | H04L 41/0631 |
| 2018/0096132 A1* | 4/2018 | Abe | G06F 21/51 |
| 2019/0114429 A1* | 4/2019 | Shimizu | H04L 9/3247 |

OTHER PUBLICATIONS

Fumiyuki Yoshida; Software Tampering Detection Method And Device; 2013 (Year: 2013).*

Atsushi Shima; Game Machine; 2014 (Year: 2014).*

* cited by examiner

FIG.6
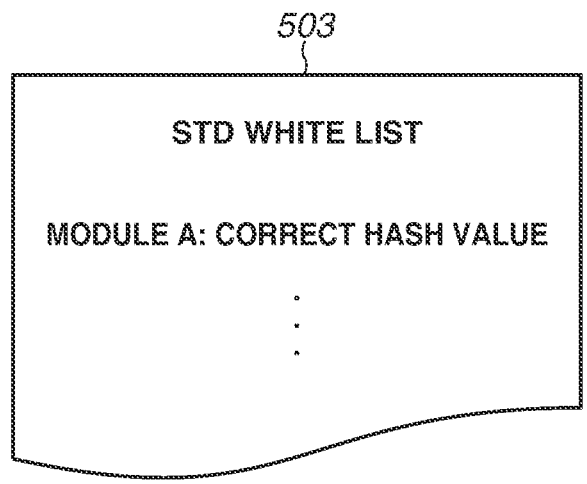
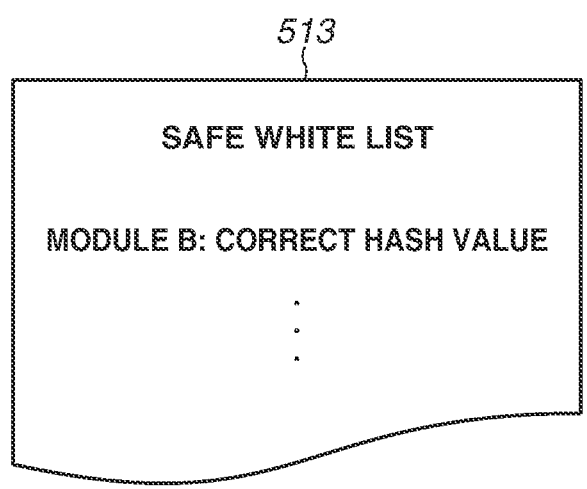
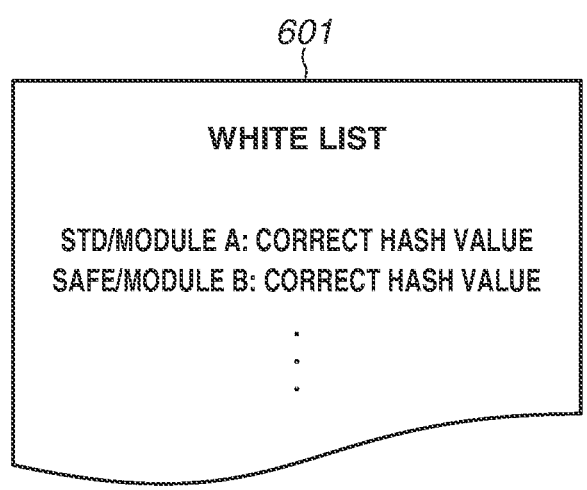

INFORMATION PROCESSING APPARATUS, INFORMATION PROCESSING METHOD, AND STORAGE MEDIUM

CROSS-REFERENCE TO RELATED APPLICATIONS

This application is a Continuation of U.S. patent application Ser. No. 16/909,893, filed Jun. 23, 2020, which claims the benefit of Japanese Patent Application No. 2019-120324, filed Jun. 27, 2019, both of which are hereby incorporated by reference herein in their entirety.

BACKGROUND OF THE INVENTION

Field of the Invention

The present invention relates to an information processing apparatus for performing alteration detection, an information processing method, and a program.

Description of the Related Art

There has been a tamper issue that a third party alters a program (hereinafter sometimes referred to as a module or an execution module) for controlling an information processing apparatus with a devious means to steal information assets in the information processing apparatus. There has been another tamper issue that an information processing apparatus with an altered module is used as a steppingstone. To prevent such tampers, a method has been devised which verifies that modules in an information processing apparatus have not been altered by a third party.

To guarantee that modules in an information processing apparatus have not been altered when the user uses functions implemented by the information processing apparatus, it is necessary to verify the integrity immediately before executing the modules for implementing the functions.

The technique discussed in Japanese Patent Application No. 2018-214138 receives a request for executing a module, calculates the hash value of the module, compares the hash value with that of a white list, and, only when the hash value coincides with that of the white list, activates the module. A white list is a list of modules which are permitted to be activated. To detect alterations of these modules, the white list stores hash values for normal modules as correct hash values. If modules unregistered in the white list or an alteration of expansion JAVA (registered trademark) applications is detected, the technique only inhibits the execution of the modules but does not deactivate the system, enabling the user to continuously operate the information processing apparatus, thus improving the operation rate. On the other hand, if an alteration of other modules is detected, the technique deactivates the system to stop operation since these modules affect the normal operation of the system.

However, the technique discussed in Japanese Patent Application No. 2018-214138 does not take into consideration the activation mode of the information processing apparatus. Therefore, even if an alteration of modules not affecting the functions of the current activation mode is detected, the technique deactivates the system, resulting in a decreased operation rate. For example, an image forming apparatus, i.e., a multi-functional peripheral (MFP) as an example of an information processing apparatus has a normal activation mode (STD mode) and an update activation mode (SAFE mode). There are modules applicable to each of the two activation modes. Even if an alteration of a module for the SAFE mode is detected when the MFP is activated in the STD mode, the technique discussed in Japanese Patent Application No. 2018-214138 deactivates the system although the functions of the STD mode are not affected, resulting in a decreased operation rate. The present invention has been devised in view of the above-described issues, and is directed to preventing the operation rate from decreasing when detecting an alteration in the execution module verification using a white list.

SUMMARY OF THE INVENTION

According to the present invention, an information processing apparatus for performing run-time alteration detection for an execution module during operation based on a white list includes a request reception unit configured to receive a request for executing the execution module, a first alteration detection unit configured to detect an alteration of the white list upon reception of the execution request, a second alteration detection unit configured to detect an alteration of an execution module which has issued the execution request, by using a white list determined to have no alteration by the first alteration detection unit, and an error control unit configured to, upon detection of an alteration by the second alteration detection unit, select and control whether to deactivate a system of the information processing apparatus or to inhibit only execution of the execution module which has issued the execution request, depending on a current activation mode of the information processing apparatus and an activation mode using the execution module which has issued the execution request.

Further features of the present invention will become apparent from the following description of exemplary embodiments with reference to the attached drawings.

BRIEF DESCRIPTION OF THE DRAWINGS

FIG. 6 illustrates examples of white lists.

DESCRIPTION OF THE EMBODIMENTS

Information processing according to an exemplary embodiment of the present invention will be described in detail below with reference to the accompanying drawings. The present exemplary embodiment will be described below centering on run-time module verification processing when an information processing apparatus executes a module and control processing of the information processing apparatus when verification fails. Exemplary embodiments of the present specification will be described below centering on a multi-functional peripheral (MFP), i.e., an image forming apparatus as an example of an information processing apparatus. The technique of the present invention is also applicable to information processing apparatuses other than multi-functional peripherals.

(Apparatus Configuration According to First Exemplary Embodiment)

Figure 1:
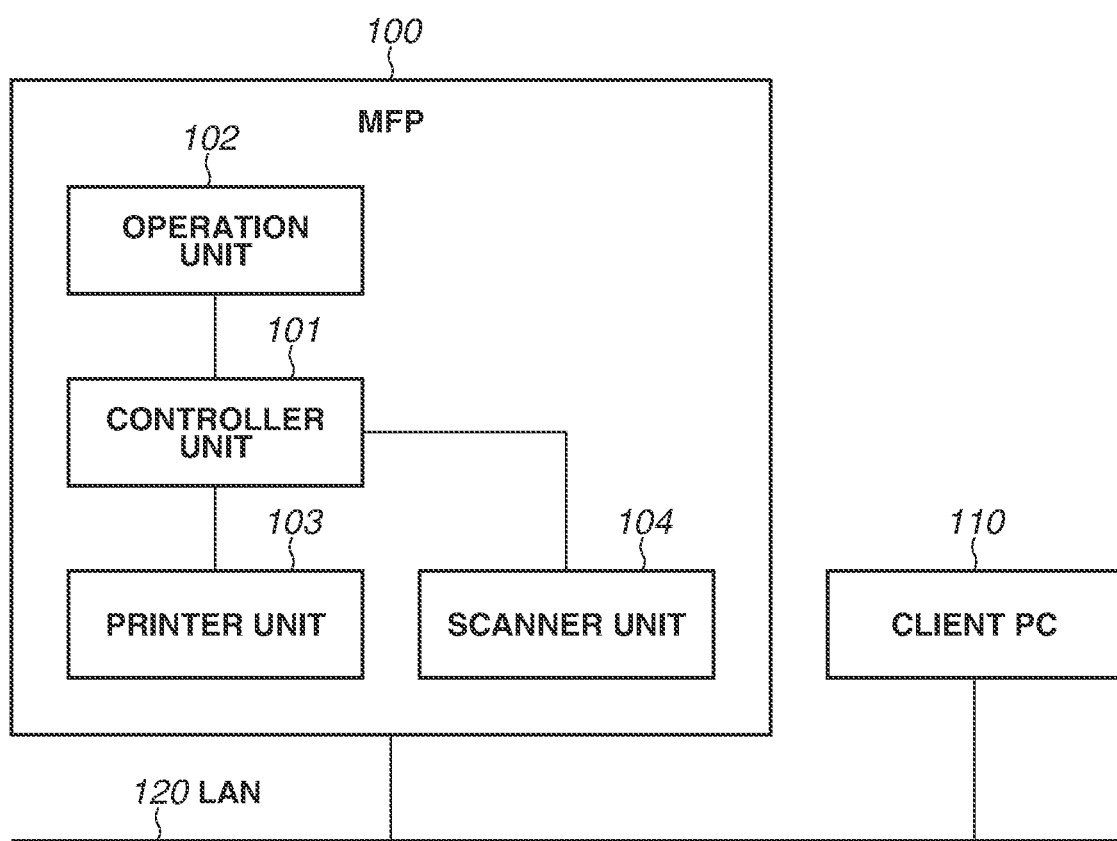
FIG. 1 is a block diagram illustrating a connection form between a multi-functional peripheral (MFP) and a personal computer (PC) according to the present invention.

FIG. 1 is a block diagram illustrating a connection form between an MFP and a client personal computer (PC) according to the present invention.

An MFP 100 and a client PC 110 are connected via a local area network (LAN) 120. The MFP 100 includes an operation unit 102 for performing input/output operations with the user. The MFP 100 includes a printer unit 103 for outputting electronic data to a paper medium. The MFP 100 includes a scanner unit 104 for scanning a paper medium and converting scan data into electronic data. The operation unit 102, the printer unit 103, and the scanner unit 104 are connected to a controller unit 101 to implement the functions as a multi-functional peripheral under control of the controller unit 101. The client PC 110 performs processing for transmitting a print job to the MFP 100.

Figure 2:
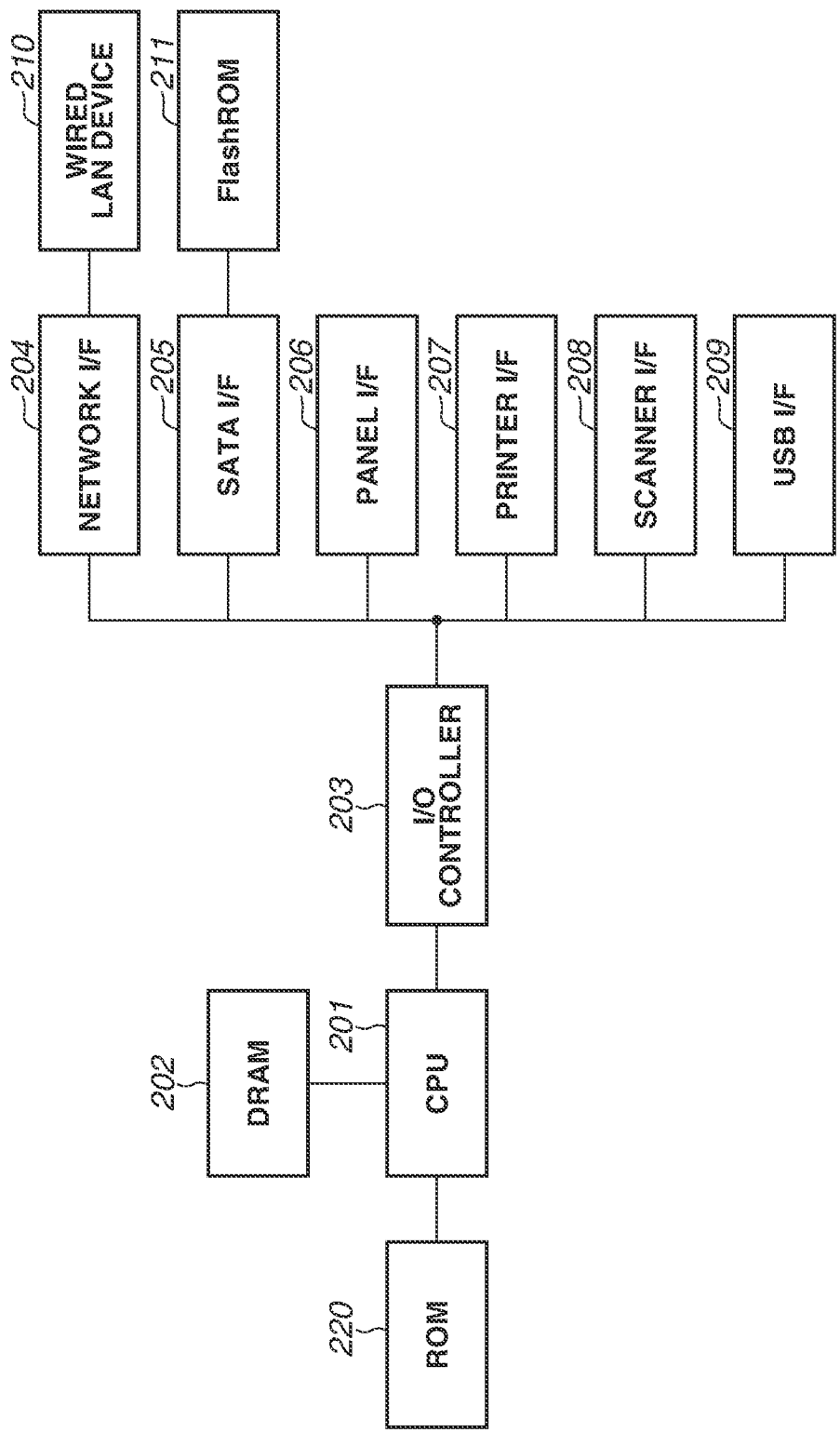
FIG. 2 illustrates an internal configuration of a controller unit of the MFP according to a first exemplary embodiment.

FIG. 2 is a block diagram illustrating details of the controller unit 101 of the MFP 100. A central processing unit (CPU) 201 performs main calculation processing in the controller unit 101. The CPU 201 is connected to a dynamic random access memory (DRAM) 202 through a bus. In the calculation process, the CPU 201 uses the DRAM 202 as a working memory to temporarily store program data representing calculation instructions and processing target data. The CPU 201 is connected to an I/O controller 203 through a bus. The I/O controller 203 performs input/output processing on various devices following instructions of the CPU 201. The I/O controller 203 is connected with a Serial Advanced Technology Attachment (SATA) interface (I/F) 205 to which a Flash read only memory (ROM) 211 is connected. The CPU 201 uses the Flash ROM 211 to permanently store programs for implementing the functions of the MFP 100 and document files. The I/O controller 203 is connected with a network I/F 204 to which a wired LAN device 210 is connected.

The CPU 201 controls the wired LAN device 210 via the network I/F 204 to implement the communication on the LAN 120. The I/O controller 203 is connected with a panel I/F 206. The CPU 201 implements user input/output operations on the operation unit 102 via the panel I/F 206. The I/O controller 203 is connected with a printer I/F 207. The CPU 201 implements processing for outputting a paper medium by using the printer unit 103 via the printer I/F 207. The I/O controller 203 is connected with a scanner I/F 208. The CPU 201 implements document read processing using the scanner unit 104 via the scanner I/F 208. The I/O controller 203 is connected with a universal serial bus (USB) I/F 209 to control an arbitrary device connected to the USB I/F 209. A ROM 220 is connected to the CPU 201 via a bus and stores a control program for implementing a Basic Input/Output System (BIOS) 360 described below.

When performing the copy function, the CPU 201 loads program data (module data) from the Flash ROM 211 into the DRAM 202 via the SATA I/F 205. According to the program (module) loaded in the DRAM 202, the CPU 201 detects a copy instruction input to the operation unit 102 by the user via the panel I/F 206. Upon detection of the copy instruction, the CPU 201 receives a document as electronic data from the scanner unit 104 via the scanner I/F 208 and stores the data in the DRAM 202. The CPU 201 subjects the image data stored in the DRAM 202 to color conversion processing suitable for output. The CPU 201 transfers the image data stored in the DRAM 202 to the printer unit 103 via the printer I/F 207 to perform processing for outputting to a paper medium.

When performing Page Description Language (PDL) printing, the client PC 110 issues a print instruction via the LAN 120. The CPU 201 loads module data from the Flash ROM 211 into the DRAM 202 via the SATA I/F 205 and, according to the module loaded in the DRAM 202, detects the print instruction via the network I/F 204. Upon detection of a PDL transmission instruction, the CPU 201 receives print data via the network I/F 204 and stores the print data in the Flash ROM 211 via the SATA I/F 205. Upon completion of print data storage, the CPU 201 loads the print data stored in the Flash ROM 211 into the DRAM 202 as image data. The CPU 201 subjects the image data stored in the DRAM 202 to color conversion processing suitable for output. The CPU 201 transfers the image data stored in the DRAM 202 to the printer unit 103 via the printer I/F 207 to perform processing for outputting to a paper medium.

A function configuration and run-time alteration detection processing according to the present exemplary embodiment will be described below.

(Function Configuration According to First Exemplary Embodiment)

Figure 3:
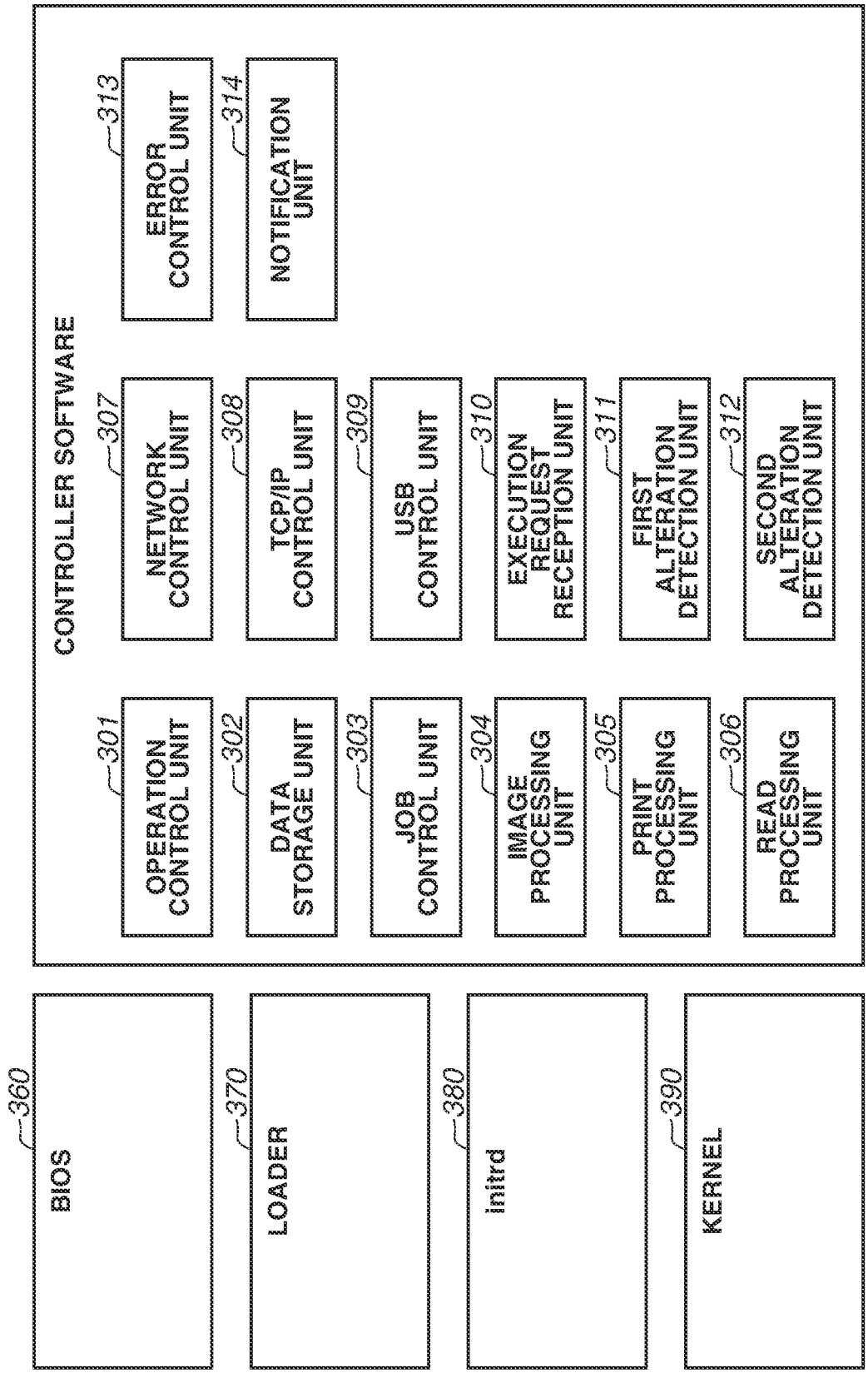
FIG. 3 is a block diagram illustrating software executed in the controller unit of the MFP according to the first exemplary embodiment.

FIG. 3 is a block diagram illustrating an example of a function configuration implemented by software executed by the controller unit 101 of the MFP 100 according to the first exemplary embodiment. All of the software executed by the controller unit 101 is executed by the CPU 201.

The CPU 201 executes the BIOS 360 stored in the ROM 220. The CPU 201 loads a loader 370, an initrd 380, and controller software 300 stored in the Flash ROM 211 into the DRAM 202 and then executes these programs. The BIOS 360 executes basic processing for enabling the CPU 201 to control the I/O controller 203 and the DRAM 202. The BIOS 360 further includes processing for loading the loader 370 from the Flash ROM 211 and starting the loader 370. The loader 370 performs processing for loading a kernel 390 and the initrd 380 according to the activation mode (described below) from the Flash ROM 211 and starting these programs. The initrd 380 performs processing for loading the controller software 300 from the Flash ROM 211 and starting the program.

An operation control unit 301 displays a screen image for the users on the operation unit 102, detects user operations, and performs processing associated with screen parts (e.g., buttons) displayed on the screen.

A data storage unit 302 stores/reads data to/from the Flash ROM 211 upon request from other control units. For example, if the user wants to change a certain device setting, the operation control unit 301 detects the contents input to the operation unit 102 by the user, and, upon request from the operation control unit 301, the data storage unit 302 stores the contents as setting values in the Flash ROM 211.

A job control unit 303 controls job execution according to instructions from other control units.

An image processing unit 304 processes image data into a suitable format for each application according to instructions from the job control unit 303.

A print processing unit 305 prints an image on a paper medium and outputs the paper medium via the printer I/F 207 according to instructions from the job control unit 303.

A read processing unit 306 reads a placed document via the scanner I/F 208 according to instructions from the job control unit 303.

When the system is activated and when a setting change is detected, a network control unit 307 performs network setting including the Internet Protocol (IP) address to a Transmission Control Protocol/Internet Protocol (TCP/IP) control unit 308 according to the setting values stored in the data storage unit 302.

The TCP/IP control unit 308 performs processing for transmitting and receiving network packets via the network I/F 204 according to instructions from other control units.

A USB control unit 309 controls the USB I/F 209 to control an arbitrary USB-connected device.

An execution request reception unit 310 receives requests for executing modules A 502 and B 512 arranged in the Flash ROM 211 (described below) during operation of the MFP 100. The state during operation of the MFP 100 refers to a state where the BIOS 360, the loader 370, the initrd 380, the kernel 390, and the controller software 300 are normally activated and the functions of the MFP 100 can be provided. More specifically, the execution request reception unit 310 has a function of receiving module execution requests for modules to be suitably executed during operation of the MFP 100.

A first alteration detection unit 311 detects alterations of a STD white list 503 and a SAFE white list 513 arranged in the Flash ROM 211 (described below) illustrated in FIG. 5. Examples of usable alteration detection methods include digital signature verification using a well-known public key encryption algorithm. In this case, the first alteration detection unit 311 verifies the signature value (signature data) of a white list by using a public key as a signature verification key to makes it possible to detect an alteration of the white list. If the first alteration detection unit 311 detects an alteration of the white list, the first alteration detection unit 311 notifies the user of the alteration detection via a notification unit 314 (described below) and then deactivates the system.

A second alteration detection unit 312 detects an alteration of the module which has issued the execution request received by the execution request reception unit 310 by using the white list determined to have no alteration by the first alteration detection unit 311. Examples of white lists include lists for verification target modules, as illustrated in FIG. 6. In these lists, the name of a module and the hash value (correct hash value) with no alteration of the module are described for each verification target module. Usable hash values include well-known SHA 256 and SHA 512. To enable the error control unit 313 (described below) to determine which activation mode each execution module is for, the STD white list 503 describing STD modules and the SAFE white list 513 describing SAFE modules are separately used. These lists are to be considered as illustrative.

The exemplary embodiment of the present invention can also be implemented by modifying the module name to distinguish between the STD and the SAFE modules as one white list 601. The second alteration detection unit 312 determines whether the module which issued the execution request (hereinafter sometimes referred to as an execution module) has been registered in the above-described white lists. When the module has been registered, the second alteration detection unit 312 calculates the hash value of the execution module, and compares the calculated hash value with the correct hash value in a white list to detect an alteration of the execution module. If an execution module is not registered in the white list, the second alteration detection unit 312 inhibits (stops) only the execution of the execution module, continuously operates the system without deactivation, and notifies the user that the execution module has been stopped via the notification unit 314 (described below).

When the second alteration detection unit 312 determines that the hash value of an execution module does not coincide with the correct hash value, the error control unit 313 changes error processing according to whether the execution module is the module for the current activation mode. More specifically, when an execution module is not the module for the current activation mode, the error control unit 313 determines that the functions of the current activation mode are not affected, and rejects only the execution request for the execution module without system deactivation. In this case, the execution of the execution module will be inhibited. On the other hand, if the execution module is the module for the current activation mode, the error control unit 313 determines that the functions of the current activation mode are affected and therefore deactivates the system. An example of a method for determining which activation mode an execution module is for will be described below. When the area where the execution module is stored is a normal activation area (STD area) 501 in the Flash ROM 211 (described below), the execution module is determined to be the STD module. On the other hand, when the area where the execution module is stored is an update activation area (SAFE area) 511, the execution module is determined to be the SAFE module. An example of a method for determining the current activation mode will be described below. When an activation mode flag 521 (described below) in the Flash ROM 211 is 0, the current activation mode is determined to be the STD activation mode. On the other hand, when the activation mode flag 521 is 1, the current activation mode is determined to be the SAFE activation mode. This makes it possible to determine whether the current activation mode coincides with the activation mode of the execution module. The value of the activation mode flag 521 is to be considered as illustrative. For example, when the activation mode flag 521 is 0, the current activation mode may be determined to be the SAFE activation mode. On the other hand, when the activation mode flag 521 is 1, the current activation mode may be determined to be the STD activation mode.

Figure 12:
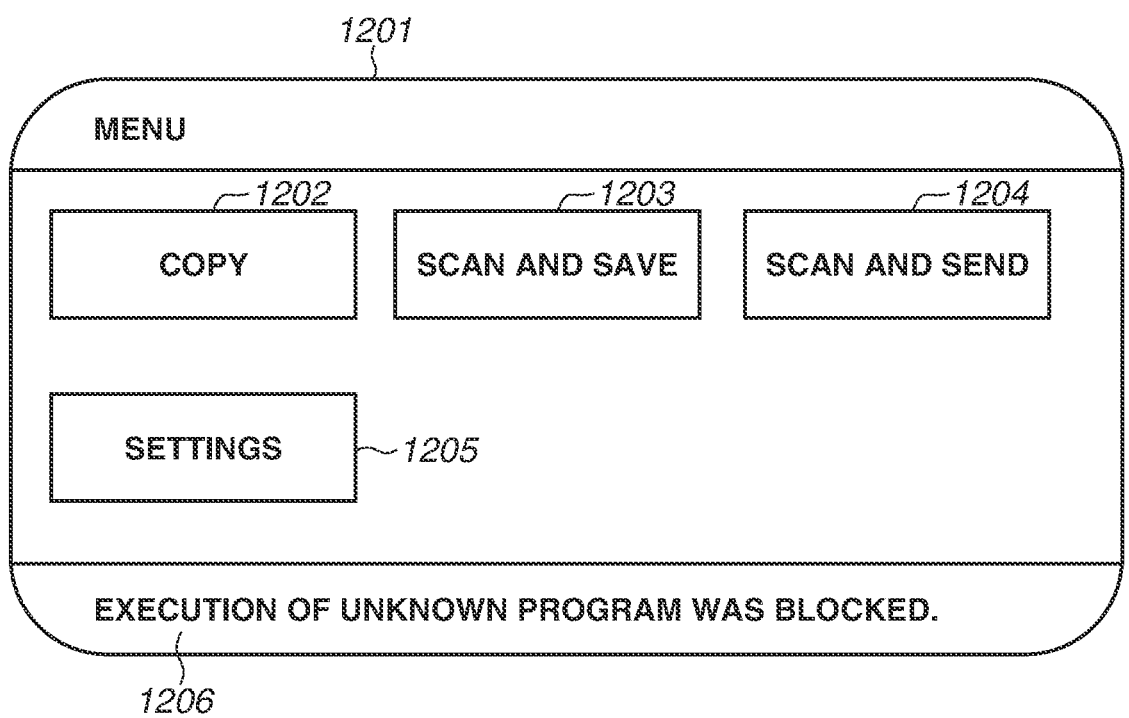
FIG. 12 illustrates an error display screen configuration when a module is stopped.
Figure 13:
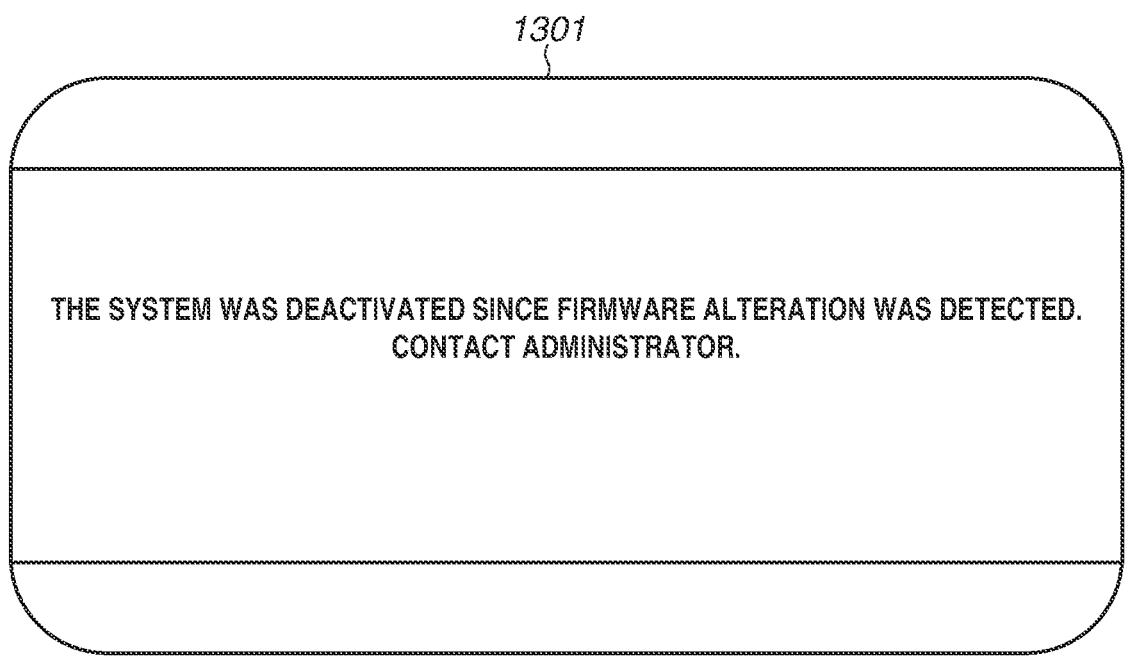
FIG. 13 illustrates an error display screen configuration when a system is deactivated.

When the execution module is stopped or the system is deactivated by the first alteration detection unit 311, the second alteration detection unit 312, and the error control unit 313, the notification unit 314 notifies the user of the stoppage/deactivation processing. An example of a notification method will be described below. For example, "Module with alteration detection/white list name", "Detection time", and "Performed error processing (module stoppage and system deactivation)" are stored in a log file for each event. Data is recorded and stored for each line as a log file in the data storage unit 302. The recorded and stored log file can be transmitted to an external management server and displayed on the operation unit 102, enabling the administrator to confirm the error status. The notification unit 314 can also display the alteration detection via a display area 1206 of the operation unit 102, as illustrated in FIG. 12. FIG. 12 illustrates a menu screen 1201 displayed on the operation unit 102. The menu screen 1201 is used for the user to specify the execution of various functions of the multifunctional peripheral. A button 1202 is used for the user to specify the copy function. A button 1203 is used for the user to specify the scan and save function. A button 1204 is used for the user to specify the scan and send function. A button 1205 is used for the user to specify setting change of a device. A display area 1206 displays various messages occurring during operation of the device to the user. For example, if an execution module unregistered in a white list is detected, the notification unit 314 displays "Execution of Unknown Program Was Blocked" on the display area 1206 to make a notification to the user. When stopping the execution module without system deactivation in this way, a notification via the display area 1206 is usable. On the other hand, when the system is to be deactivated, the notification unit 314 displays a message indicating the system deactivation on the entire area 1301 of the operation unit 102, as illustrated in FIG. 13. Since the system is deactivated, the entire area 1301 with no button display displays a message indicating that the system has been deactivated since an alteration was detected. The notification unit 314 may perform either one or both of the recording in the log file and the error display on the operation unit 102.

Figure 5:
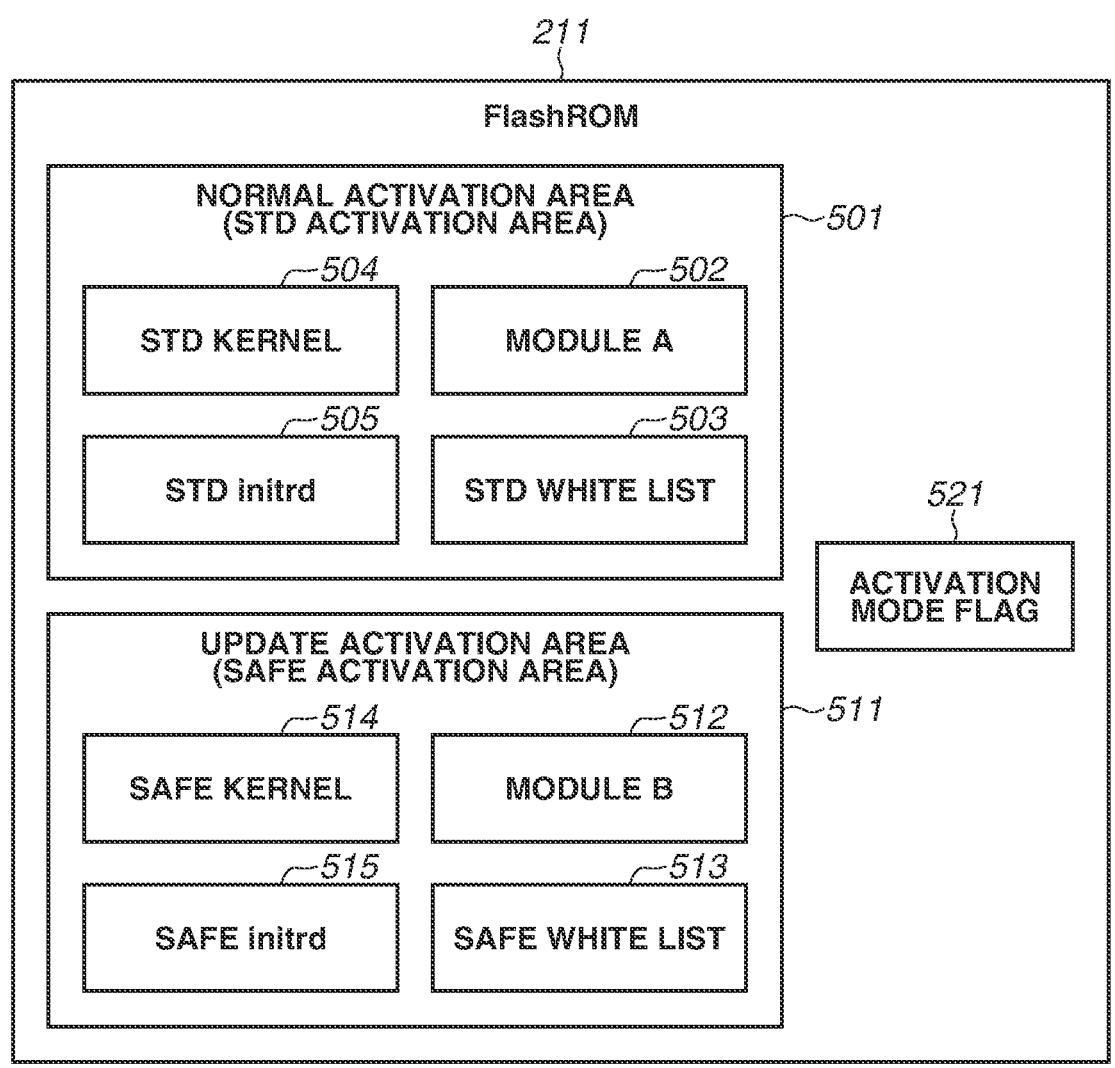
FIG. 5 illustrates an example of data arranged in a flash read only memory (ROM).
Figure 7A:
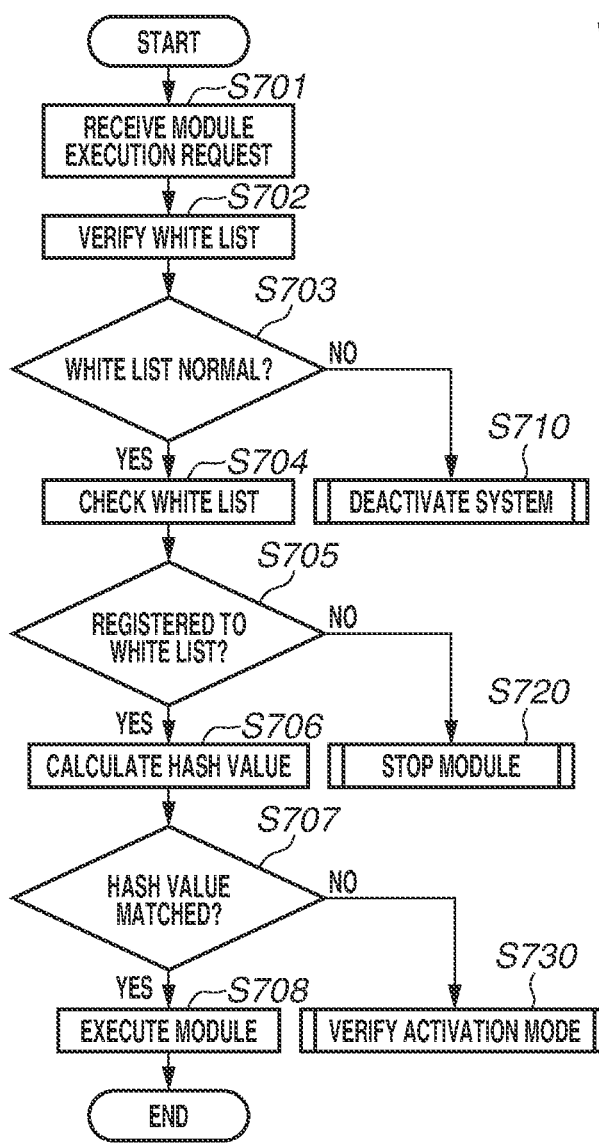
FIGS. 7A to 7D are flowcharts illustrating processing of the MFP according to the first exemplary embodiment.
Figure 7B:
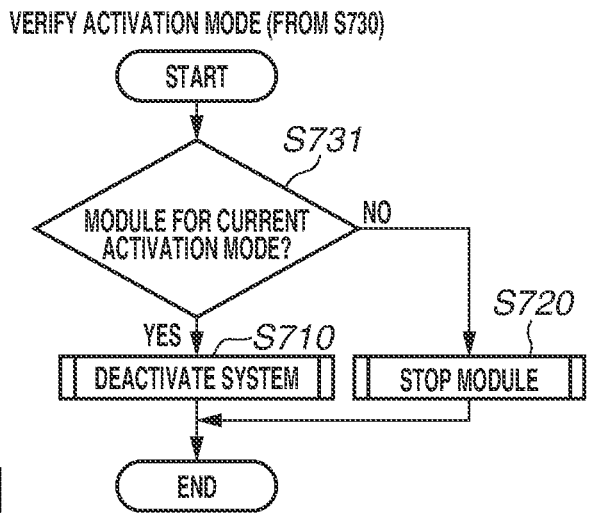
Figure 7C:
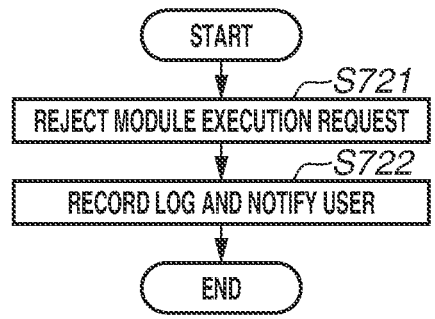
Figure 7D:
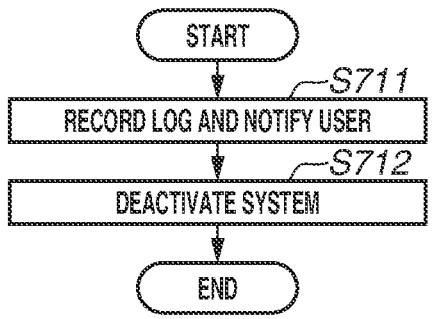
Figure 8:
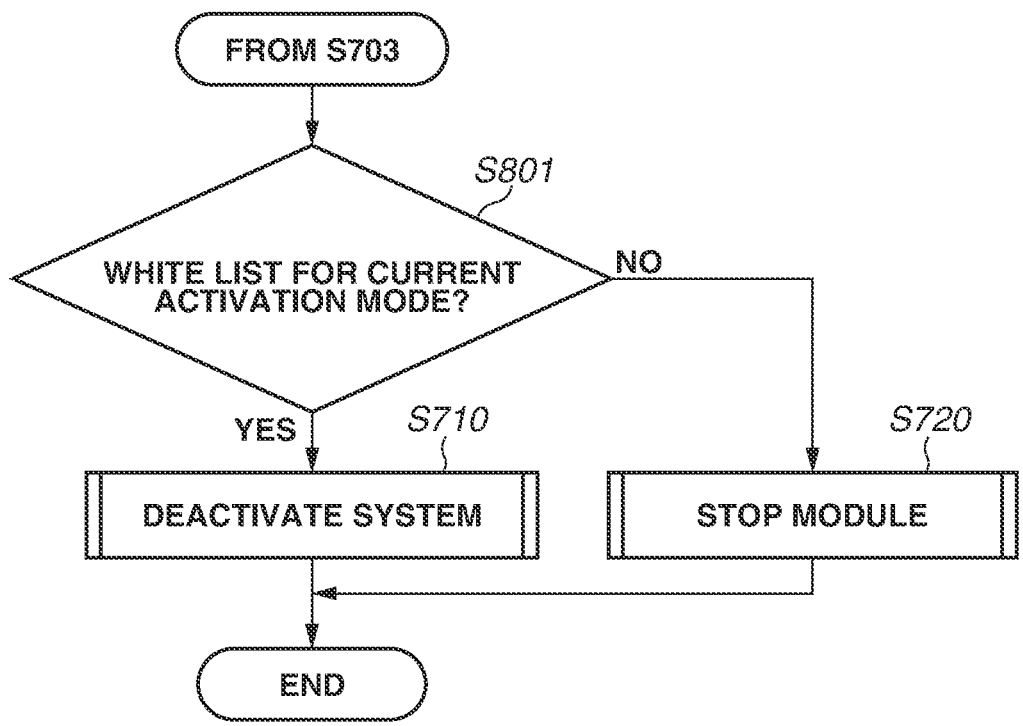
FIG. 8 is a flowchart illustrating processing of the MFP according to a modification of the first exemplary embodiment.

FIG. 5 illustrates an example of data arranged in the Flash ROM 211.

The Flash ROM 211 is logically divided into three different usage areas for each activation mode: the normal activation area (STD activation area) 501, the update activation area (SAFE activation area) 511, and the other common area. This configuration is to be considered as illustrative, and additional activation modes other than STD and SAFE modes may be provided. In this case, the area of the Flash ROM 211 can be additionally divided. The STD activation area 501 includes the module A 502 (described below), the STD white list 503, a STD kernel 504, and an STD initrd 505. The SAFE activation area 511 includes the module B 512 (described below), the SAFE white list 513, a SAFE kernel 514, and a SAFE initrd 515. The activation mode flag 521 stored in the common area is used to determine the current activation mode. For example, the loader 370 reads the activation mode flag 521. When the activation mode flag 521 indicates the STD activation mode, the loader 370 loads the STD kernel 504 and STD initrd 505 to start the STD activation mode. Likewise, when the activation mode flag 521 indicates the SAFE activation mode, the loader 370 loads the SAFE kernel 514 and SAFE initrd 515 to start the SAFE activation mode. The module A 502 includes the module for the STD activation. When this module is executed, functions necessary for normal activation are provided via the MFP 100. Likewise, the module B 512 includes the module for the SAFE activation. When this module is executed, functions necessary for update activation are provided via the MFP 100. The STD white list 503 describes the module A 502 for STD activation subjected to the execution module verification together with the correct hash value, as illustrated in FIG. 6. Likewise, the SAFE white list 513 describes the module B 512 for SAFE activation subjected to the execution module verification together with the correct hash value, as illustrated in FIG. 6. In the following descriptions, the STD activation area 501 includes the module A 502, and the SAFE activation area 511 includes the module B 512. A plurality of other modules may be included in these activation areas.

(Processing Flow According to First Exemplary Embodiment)

The run-time alteration detection processing and error-time processing (processing at the time of alteration detection) according to the present exemplary embodiment will be described below with reference to the flowcharts illustrated in FIGS. 7A to 7D.

In step S701, the execution request reception unit 310 receives a module execution request. In step S702, the first alteration detection unit 311 verifies whether a white list includes an alteration. When the first alteration detection unit 311 detects an alteration of the white list (NO in step S703), the processing proceeds to step S710. In steps S710, S711, and S712, the notification unit 314 records a log and displays a screen on the operation unit 102 to notify the user of the situation and then the system is deactivated. On the other hand, when the first alteration detection unit 311 detects no alteration in the white list (YES in step S703), the processing proceeds to step S704. In step S704, the second alteration detection unit 312 checks whether the module that has issued the module execution request is registered in the white list. When the module is not registered in the white list (NO in step S705), the processing proceeds to step S720. In steps S720, S721, and S722, the notification unit 314 records a log, and displays a screen on the operation unit 102 to notify the user of the situation. The execution request reception unit 310 rejects the received execution request to block (stop) the execution of the current module. On the other hand, when the module is registered in the white list (YES in step S705), the processing proceeds to step S706. In steps S706 and S707, the second alteration detection unit 312 calculates the hash value of the current module and then compares the calculated hash value with the correct hash value registered in the white list. When the two hash values are matched as a result of the comparison (YES in step S707), the processing proceeds to step S708. In step S708, the second alteration detection unit 312 permits the execution of the current module to execute the current module. On the other hand, when the two hash values are mismatched (NO in step S707), the processing proceeds to S730. When the error control unit 313 determines that the current module is the module for the current activation mode (YES in step S731), the processing proceeds to step 710. In steps S710, S711, S712, the error control unit 313 deactivates the system. On the other hand, when the error control unit 313 determines that the current module is the module for the activation mode different from the current activation mode (NO in step S731), the processing proceeds to step S720. In steps S720, S721, and S722, the error control unit 313 only stops the current module.

The order of execution of the log recording and user notification (step S711), the system deactivation (step S712), the module execution rejection (step S721), and the log recording and user notification (step S722) are to be considered as illustrative, and may be changed.

According to the exemplary embodiment, if an alteration of a module not affecting the functions of the current activation mode is detected, only the current module is stopped without system deactivation, making it possible to improve the operation rate while maintaining security.

(Modification of First Exemplary Embodiment)

Although, in the first exemplary embodiment, the error control unit 313 changes error processing according to the activation mode of the execution module, the error processing may be changed according to the activation mode of the white list. More specifically, according to the first exemplary embodiment, when the first alteration detection unit 311 detects an alteration of the white list, the system is immediately deactivated in step S710. According to the present modification, if an alteration is detected in a white list different from the white list for the current activation mode, only the execution module is stopped. The white list for the current activation mode can be determined in a similar way to the case of the execution modules. More specifically, the present modification determines the current activation mode by using the activation mode flag 521, making it possible to determine which activation mode the white list currently being referenced in the storage areas of the white lists 503 and 513 is for. An example where the activation mode flag 521 indicates the STD activation mode will be described below. If an alteration of the STD white list 503 is detected, the system is deactivated. If an alteration of the SAFE white list 513 is detected, only the execution module is stopped. More specifically, according to the present modification, the error control unit 313 will be provided with an error processing change function based on the above-described determination of the activation mode for the white list.

Processing flows according to the present modification will be described below with reference to FIGS. 7A, 7C, 7D, and 8. In step S701, the execution request reception unit 310 receives a module execution request. In step S702, the first alteration detection unit 311 verifies whether a white list includes an alteration. When the first alteration detection unit 311 detects an alteration of the white list (NO in step S703), the processing proceeds to step S801. In step S801, the error control unit 313 determines whether the current white list is the white list for the current activation mode. When the error control unit 313 determines that the current white list is the white list for the current activation mode (YES in step S801), the processing proceeds to step S710. In steps S710, S711, and S712, the error control unit 313 deactivates the system. On the other hand, when the error control unit 313 determines that the current white list is the white list for the activation mode different from the current activation mode (NO in step S801), the processing proceeds to step S720. In steps S720, S721, and S722, the error control unit 313 stops only the module which issued the execution request.

According to the present modification, if an alteration of the white list irrelevant to the current activation mode is detected, only the execution module is stopped without system deactivation, making it possible to improve the operation rate while maintaining security.

An information processing according to a second exemplary embodiment of the present invention will be described below. According to the second exemplary embodiment, configurations approximately similar to those of the first exemplary embodiment are assigned the same reference numerals and duplicated descriptions thereof will be omitted.

According to the second exemplary embodiment, when the first alteration detection unit 311 detects an alteration of the white list, the first alteration detection unit 311 determines whether the MFP 100 is normal. When the MFP 100 is determined to be normal, the while list generation unit 401 regenerates a white list based on the current module. This makes it possible to automatically regenerate a white list as required and continue operations without system deactivation or module stoppage, further improving the operation rate.

The apparatus configuration, function configuration, and processing flow according to the present exemplary embodiment will be described below.

(Apparatus Configuration According to Second Exemplary Embodiment)

Figure 11:
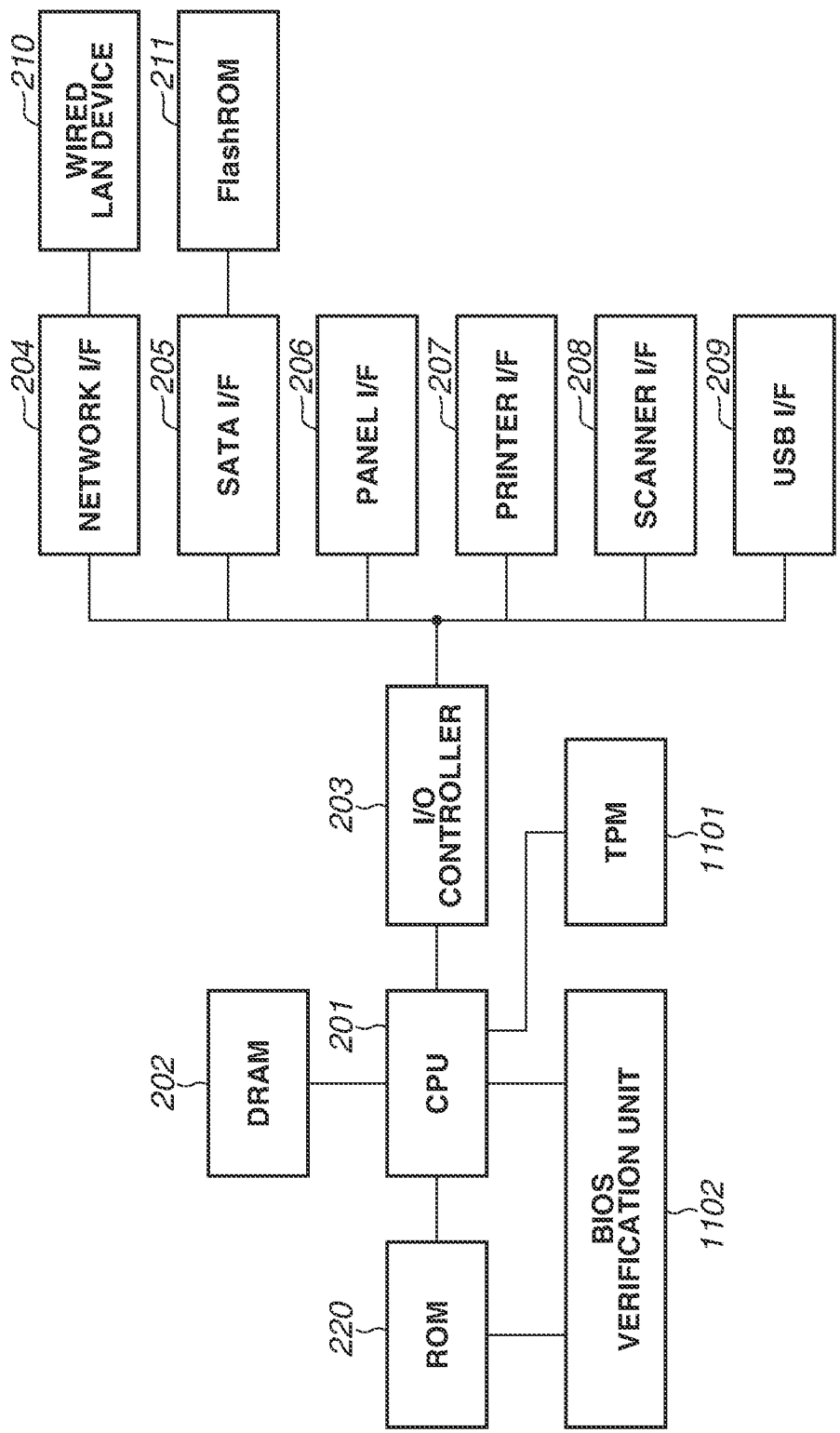
FIG. 11 illustrates an internal configuration of the controller unit of the MFP according to the second exemplary embodiment.

An example of an apparatus configuration according to the second exemplary embodiment will be described below with reference to the block diagram illustrated in FIG. 11.

The information processing apparatus according to the second exemplary embodiment includes the apparatus configuration according to the first exemplary embodiment, a Trusted Platform Module (TPM) 1101 as a tamper-resistant security chip, and a BIOS verification unit 1102.

The TPM 1101 is a tamper-resistant security chip. The tamper resistance refers to the characteristics for making analysis from the outside difficult and, when being analyzed from the outside, performing self-defense by destroying the internally stored modules and data. The TPM 1101 includes a nonvolatile random access memory (NVRAM) and a plurality of Platform Configuration Registers (PCRs).

The NVRAM is a nonvolatile memory to/from which arbitrary data can be written and read.

The PCRs form a volatile memory in which the hash values of the BIOS 360, the loader 370, the initrd 380, and the kernel 390 are stored when the MFP 100 is activated.

Processing for storing the hash values in the PCRs will be described below. In the processing for storing hash values, the following calculation is performed by using a hash value Hash1 prestored in a predetermined PCR or a hash value Hash2 of software or data input from the outside of the TPM 1101, and the result of the calculation, Result1, is stored in the PCR.

$$\text{Result1} = H(\text{Hash1} | \text{Hash2}) \quad \text{(Equation 1)}$$

H(x) is a hash function for a value x. As hash functions, SHA1, SHA256, SHA512, and other known algorithms are applicable. "x|y" indicates the connection of the values x and y.

The above-described processing for storing hash values in the PCRs is performed, for example, when the MFP 100 is activated.

The TPM 1101 is provided with a device certification function called the quote function of transmitting to an external server the hash value (stored in the PCR) with an attached digital signature (signature data) by using a signature generation key managed in the TPM 1101. By using the signature data generated by the quote function and the hash value in the PCR, the integrity verification for the module activated by the MFP 100 can be performed by the external server. More specifically, the external server verifies the signature data of the hash values in the PCRs received from the MFP 100, by using the signature verification key, to verify the presence or absence of an alteration in the received hash values in the PCRs. When the signature verification is successful, an alteration of each module of the MFP 100 can be remotely detected by comparing the correct hash value of each module of the MFP 100 held by the external server with each of the received hash values in the PCRs.

The BIOS verification unit 1102 connected to the ROM 220 and the CPU 201 via a bus verifies BIOS data stored in the ROM 220 and instructs the CPU 201 to perform BIOS activation. In this case, it is explicitly noted that the BIOS verification unit 1102 is hardware to confirm that the BIOS verification is hardware verification. To prevent the bus connecting between the BIOS verification unit 1102 and the CPU 201 from being tooled by a malicious third party, the bus is configured as the same chip or implemented in a similar configuration to prevent it from being physically checked from the outside. Although the present exemplary embodiment assumes that the control mechanism of the BIOS verification unit 1102 is implemented by hardware as an integrated circuit, elements such as a dedicated CPU and a ROM storing control software may be implemented in the same chip and cannot be changed after the manufacturing.

(Function Configuration According to Second Exemplary Embodiment)

Figure 4:
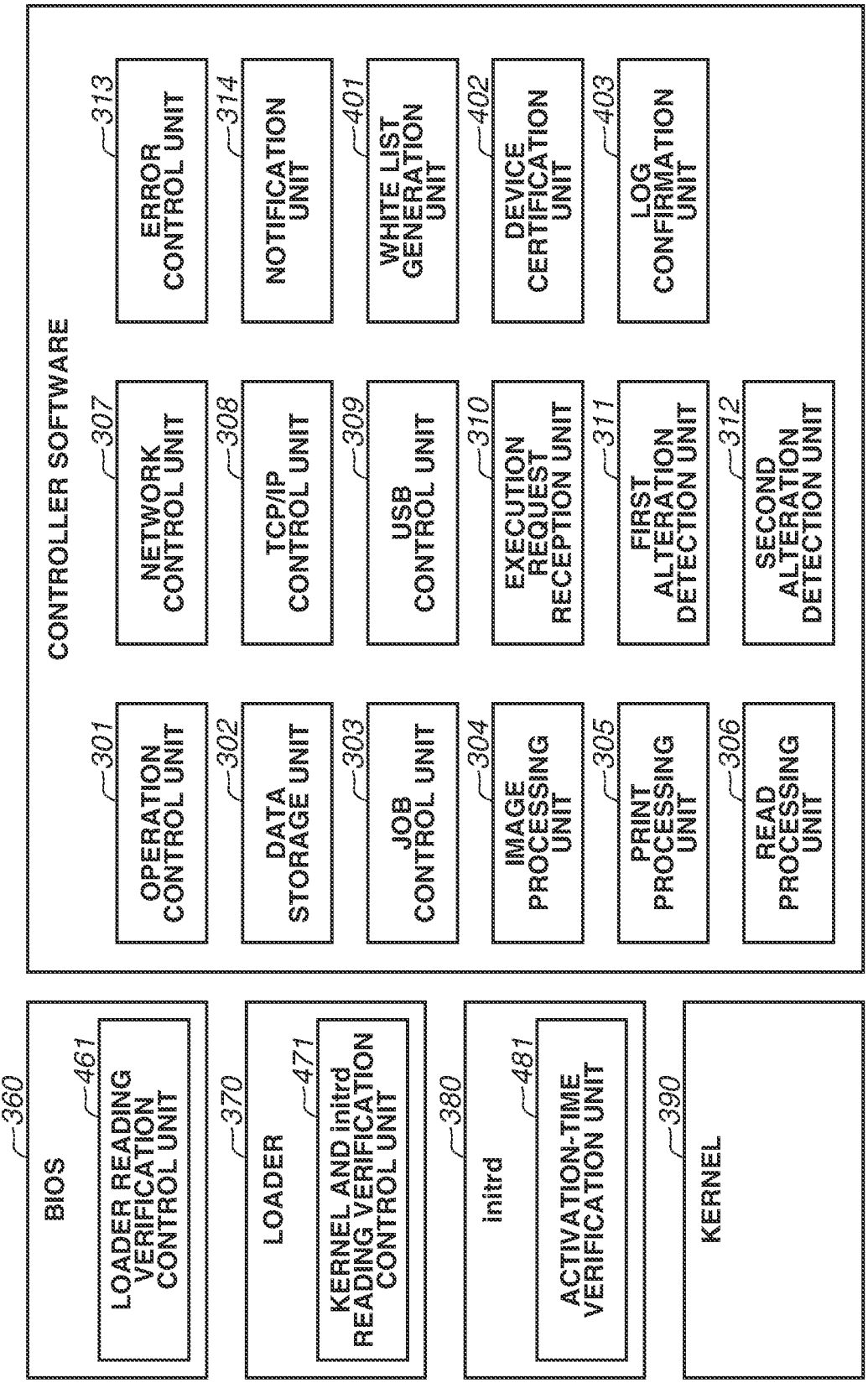
FIG. 4 is a block diagram illustrating software executed in the controller unit of the MFP according to a second exemplary embodiment.

FIG. 4 is a block diagram illustrating an example of a function configuration according to the second exemplary embodiment.

The second exemplary embodiment includes the function configuration according to the first exemplary embodiment, and further includes a loader reading verification control unit 461, a kernel and initrd reading verification control unit 471, an activation-time verification unit 481, a white list generation unit 401, a device certification unit 402, and a log confirmation unit 403. The BIOS 360, the loader 370, and the initrd 380 are provided with functions according to the first exemplary embodiment and some additional functions, and will be described below.

The BIOS 360 includes the functions according to the first exemplary embodiment, and internally includes control software as the BIOS and signature data corresponding to the control software.

The loader 370 includes the functions according to the first exemplary embodiment, and internally includes control software as a loader and signature data corresponding to the control software.

The initrd 380 includes the functions according to the first exemplary embodiment, and internally includes control software as initrd and signature data corresponding to the control software.

The loader reading verification control unit 461 included in the control software of the BIOS 360 includes processing for verifying the loader and the public key corresponding to the signature given to the loader.

The kernel and initrd reading verification control unit 471 included in the loader 370 includes processing for verifying kernel and initrd and the public key corresponding to the signature given to the kernel and initrd.

The activation-time verification unit 481 included in the initrd 380 includes processing for verifying all modules configuring the controller software 300 at the time of activation and the public key corresponding to the given signature. The private key for all of the signature data is used only at the time of software development and is not generally circulated.

The above-described activation-time verification for each module by the BIOS verification unit 1102, the loader reading verification control unit 461, the kernel and initrd reading verification control unit 471, and the activation-time verification unit 481 may be collectively referred to as an activation-time verification function.

The white list generation unit 401 regenerates a white list only when the first alteration detection unit 311 detects an alteration of the white list and it is determined that the MFP 100 is normal. The above-described activation-time verification function, the verification by the device certification unit 402 (described below), and the verification by the log confirmation unit 403 (described below) are used for determining whether the MFP 100 is normal. The white list generation unit 401 calculates the hash values based on various modules (the module A 502 and the module B 512) in the MFP 100 determined to be normal, generates the white lists illustrated in FIG. 6, and replaces altered white lists with the generated white lists, thus implementing the white list regeneration. The alteration detection of a white list can be performed by generating signature data of a regenerated white list by using the signature generation key stored in the TPM 1101.

The device certification unit 402 makes an inquiry to an external server via the TCP/IP control unit 308 about whether modules such as the BIOS 360, the loader 370, the initrd 380, and the kernel 390 are altered, by using the above-described quote function of the TPM 1101. This makes it possible to remotely determine whether the MFP 100 is normal.

The log confirmation unit 403 reads the log file recorded by the notification unit 314 and confirms whether a log of module alteration is described to determine whether various modules of the MFP 100 are normal. More specifically, if a log of module alteration is described in the log file, an altered module exists in the MFP 100. Therefore, it is determined that the MFP 100 is abnormal. On the other hand, if no log of module alteration is described in the log file, it is determined that all modules are normal and that the MFP 100 itself is also normal. This processing is to be considered as illustrative. For example, if a log of module alteration is described in the log file, and a log of module alteration restored to the normal state is described therein afterward, it may be determined that the module has returned to the normal state and that the MFP 100 is normal.

(Processing Flow According to Second Exemplary Embodiment)

Processing flows according to the second exemplary embodiment will be described below with reference to FIGS. 9, 10A, 10B, and 10C.

Figure 9:
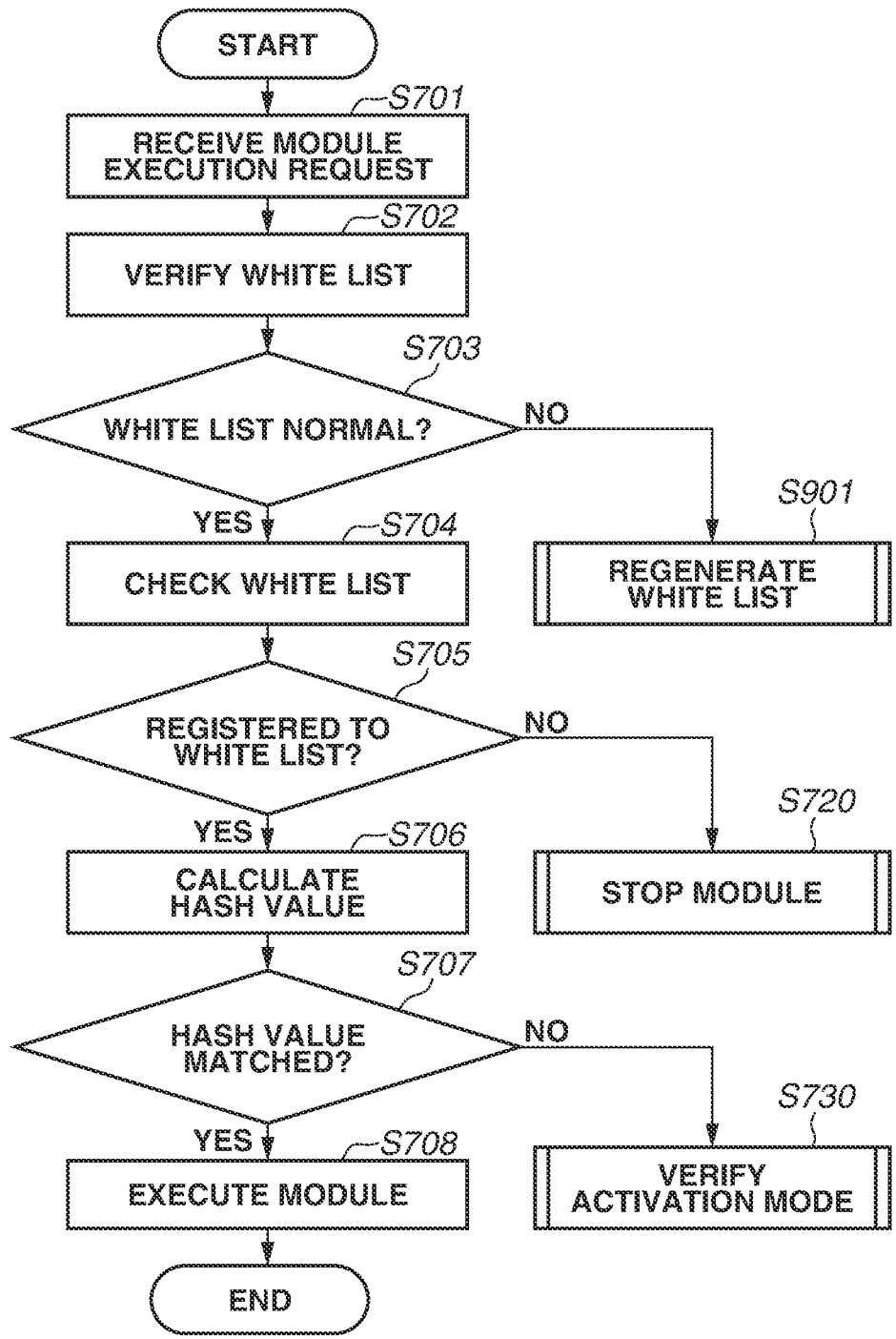
FIG. 9 is a flowchart illustrating processing of the MFP according to the second exemplary embodiment.
Figure 10A:
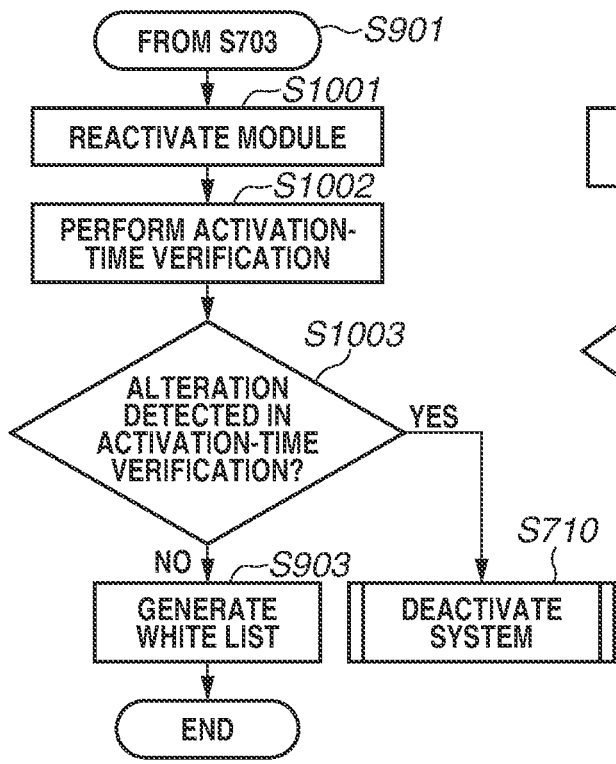
FIGS. 10A to 10C are flowcharts illustrating processing of the MFP in white list regeneration processing according to the second exemplary embodiment.

A white list regeneration processing flow by the activation-time verification function will be described below with reference to FIGS. 9 and 10A.

In step S701, the execution request reception unit 310 receives a module execution request. In step S702, the first alteration detection unit 311 verifies whether a white list includes an alteration. When the first alteration detection unit 311 detects an alteration of the white list (NO in step S703), the processing proceeds to step S901. Then, in step S1001, the first alteration detection unit 311 reactivates the system. Then, in step S1002, the BIOS verification unit 1102, the loader reading verification control unit 461, the kernel and initrd reading verification control unit 471, and the activation-time verification unit 481 perform the activation-time verification. When the first alteration detection unit 311 detects no alteration in the activation-time verification (NO in step S1003), the processing proceeds to step S903. In step S903, it is determined that the MFP 100 is normal and the white list generation unit 401 then regenerates a white list. On the other hand, when the first alteration detection unit 311 detects an alteration in the activation-time verification (YES in step S1003), the processing proceeds to step S710. In step S710, the first alteration detection unit 311 determines that the MFP 100 is abnormal and then deactivates the system.

Figure 10B:
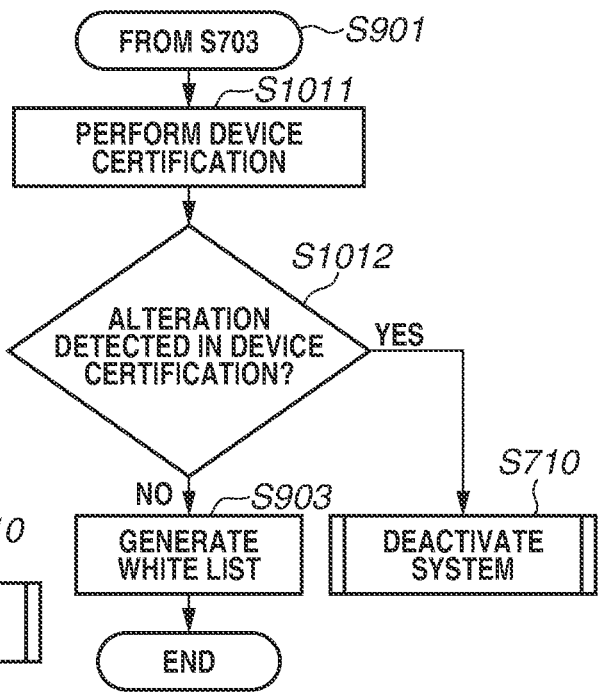

A white list regeneration processing flow by the device certification function (quote function) of the TPM 1101 will be described below with reference to FIGS. 9 and 10B.

In step S701, the execution request reception unit 310 receives a module execution request. In step S702, the first alteration detection unit 311 verifies whether a white list includes an alteration. When the first alteration detection unit 311 detects an alteration of the white list (NO in step S703), the processing proceeds to step S901. Then, in step S1011, the device certification unit 402 performs device certification through the quote function of the TPM 1101. When the first alteration detection unit 311 detects no alteration of the white list (NO in step S1012), the processing proceeds to step S903. In step S903, it is determined that the MFP 100 is normal and the white list generation unit 401 regenerates a white list. On the other hand, when the first alteration detection unit 311 detects an alteration of the white list (YES in step S1012), the processing proceeds to step S710. In step S710, the first alteration detection unit 311 determines that the MFP 100 is abnormal and then deactivates the system.

Figure 10C:
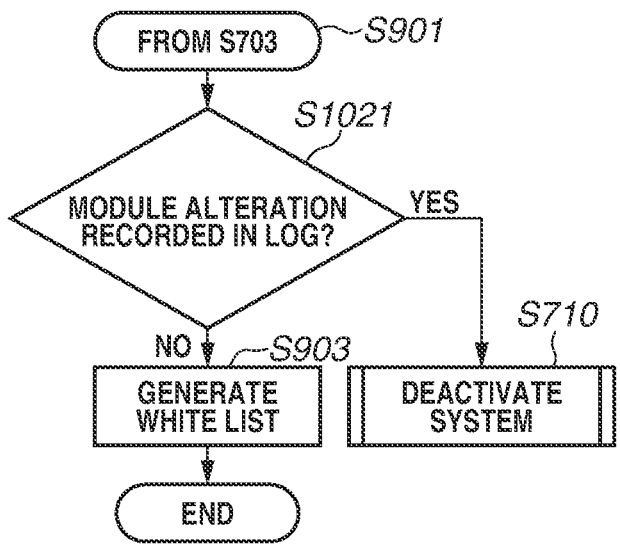

A white list regeneration processing flow by the log confirmation unit 403 will be described below with reference to FIGS. 9 and 10C.

In step S701, the execution request reception unit 310 receives a module execution request. In step S702, the first alteration detection unit 311 verifies whether a white list includes an alteration. When the first alteration detection unit 311 detects an alteration of the white list (NO in step S703), the processing proceeds to step S901. Then, in step S1021, the log confirmation unit 403 confirms the log file to determine whether the MFP 100 is normal. When the log confirmation unit 403 determines that the MFP 100 is normal as a result of confirming the log file (NO in step S1021), the processing proceeds to step S903. In step S903, the white list generation unit 401 regenerates a white list. On the other hand, when the log confirmation unit 403 determines that the MFP 100 is abnormal (YES in step S1021), the processing proceeds to step S710. In step S710, the white list generation unit 401 deactivates the system.

As described above, if a white list is altered, the present exemplary embodiment attempts to regenerate a white list as long as various modules of the MFP 100 are normal, without system deactivation, thus improving the operation rate.

(Modification of Second Exemplary Embodiment)

Figure 14:
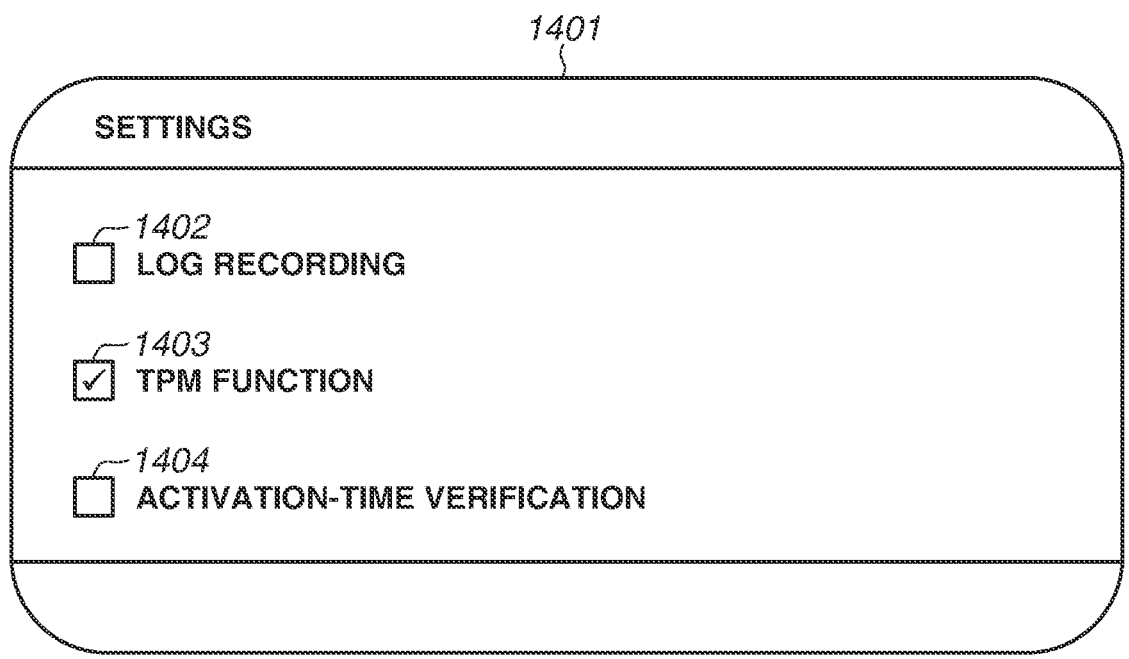
FIG. 14 illustrates a setting display screen configuration according to a modification of the second exemplary embodiment.

The second exemplary embodiment enables the white list generation unit 401, if an alteration of a white list is detected, to dynamically select means for confirming whether the MFP 100 is normal depending on usable means. The modification will be described below with reference to a setting window 1401 illustrated in FIG. 14. FIG. 14 illustrates the setting window 1401 displayed on the operation unit 102 after a screen transition when a setting key 1205 illustrated in FIG. 12 is pressed. When log recording 1402 is selected, a function of recording events in the log file by the above-described notification unit 314 is enabled. When TPM function 1403 is selected, the above-described hash value storage in the PCR of the TPM 1101 and the device certification function based on the quote function are enabled. When activation-time verification 1404 is selected, the above-described activation-time verification function is enabled. For example, in the setting window 1401 illustrated in FIG. 14, only TPM function 1403 is enabled. Therefore, in steps S1011 and S1012, the white list generation unit 401 confirms whether the MFP 100 is normal by using the device certification function by the device certification unit 402. Likewise, when only log recording 1402 is enabled, then in step S1021, the white list generation unit 401 confirms whether the MFP 100 is normal by using the log confirmation unit 403. When only activation-time verification 1404 is enabled, then in step S1001, the system is reactivated. Then, in steps S1002 and S1003, the BIOS verification unit 1102, the loader reading verification control unit 461, the kernel and initrd reading verification control unit 471, and the activation-time verification unit 481 perform the activation-time verification, and the white list generation unit 401 confirms whether the MFP 100 is normal.

Although a case where only one setting is enabled has been described above, a case where two or three settings are enabled at the same time is also applicable to the present invention. In this case, the three settings may be given priority, and a setting having higher priority may be selected. An example case where all of log recording 1402, TPM function 1403, and activation-time verification 1404 are enabled, and log recording 1402, TPM function 1403, and activation-time verification 1404 are given priority "1", "2", and "3", respectively, will be assumed below (a larger number indicates higher priority). In this case, the white list generation unit 401 can confirm whether the MFP 100 is normal by using the activation-time verification function having the highest priority. On the other hand, if all of the above-described settings are disabled, the white list generation unit 401 cannot confirm the status of the MFP 100. In this case, therefore, the white list generation unit 401 deactivates the system or stops the current module without regenerating a white list, unlike the first exemplary embodiment.

As described above, the present modification regenerates a white list by using dynamically suitable means depending on usable functions, thus improving the operation rate.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus for performing alteration detection for an execution module, the information processing apparatus comprising:

one or more processors; and at least one memory storing executable instructions, which when executed by the one or more processors, cause the information processing apparatus to:

detect an alteration of the execution module;

stop a system of the information processing apparatus if the execution module is determined to be a predetermined type of module after an alteration is detected by the alteration detection;

restrict execution of the execution module and proceed to operate the system of the information processing apparatus if the execution module is not determined to be a predetermined type of module after the alteration is detected by the alteration detection;

display, if the execution of the execution module is restricted, a message indicating that the execution of the execution module is restricted with a function menu of the information processing apparatus on a display of the information processing apparatus; and display a menu indicating that the system of the information processing apparatus is stopped, if the system of the information processing apparatus is stopped, on the display of the information processing apparatus.

2. The information processing apparatus according to claim 1, wherein the executable instructions, when executed by the one or more processors, cause the information processing apparatus to:

stop execution of the execution module after the alteration is detected by the alteration detection.

3. The information processing apparatus according to claim 1, further comprising:

a Trusted Platform Module (TPM) as a tamper-resistant security chip, wherein the executable instructions, when executed by the one or more processors, cause the information processing apparatus to:

detect the alteration of the execution module by using the TPM.

4. The information processing apparatus according to claim 1, wherein the executable instructions, when executed by the one or more processors, cause the information processing apparatus to:

detect the alteration of the execution module by using a hash value.

5. The information processing apparatus according to claim 1, wherein the executable instructions, when executed by the one or more processors, further cause the information processing apparatus to:

determine that the execution module is a module for the current activation mode of the information processing apparatus if the execution module is stored in an area of the current activation mode.

6. The information processing apparatus according to claim 1, wherein the executable instructions, when executed by the one or more processors, further cause the information processing apparatus to:

determine that the execution module is a module for the current activation mode of the information processing apparatus if the current activation mode of the information processing apparatus is identical to an activation mode related to the execution module.

7. The information processing apparatus according to claim 1, wherein the function menu of the information processing apparatus is a multi-function peripheral menu.

8. An information processing method performed by an information processing apparatus for performing alteration detection for an execution module, the information processing method comprising:

detecting an alteration of the execution module;

stopping a system of the information processing apparatus if the execution module is determined to be a predetermined type of module after an alteration is detected by the alteration detection;

restricting execution of the execution module and proceeding to operate the system of the information processing apparatus if the execution module is not determined to be a predetermined type of module after the alteration is detected by the alteration detection;

displaying, if the execution of the execution module is restricted, a message indicating that the execution of the execution module is restricted with a function menu of the information processing apparatus on a display of the information processing apparatus; and displaying a menu indicating that the system of the information processing apparatus is stopped, if the system of the information processing apparatus is stopped, on the display of the information processing apparatus.

9. A non-transitory storage medium storing a program causing an information processing apparatus to execute an information processing method, the information processing method comprising:

detecting an alteration of an execution module;

stopping a system of the information processing apparatus if the execution module is determined to be a predetermined type of module after an alteration is detected by the alteration detection;

restricting execution of the execution module and proceeding to operate the system of the information processing apparatus if the execution module is not determined to be a predetermined type of module after the alteration is detected by the alteration detection;

displaying, if the execution of the execution module is restricted, a message indicating that the execution of the execution module is restricted with a function menu of the information processing apparatus on a display of the information processing apparatus; and displaying a menu indicating that the system of the information processing apparatus is stopped, if the system of the information processing apparatus is stopped, on the display of the information processing apparatus.

10. A multi-function peripheral apparatus for performing alteration detection for an execution module, the multi-function peripheral apparatus comprising:

one or more processors; and at least one memory storing executable instructions, which, when executed by the one or more processors, cause the multi-function peripheral apparatus to:

detect an alteration of the execution module;

stop a system of the multi-function peripheral apparatus if the execution module is determined to be a predetermined type of module after an alteration is detected by the alteration detection;

restrict execution of the execution module and proceed to operate the system of the multi-function peripheral apparatus if the execution module is not determined to be a predetermined type of module after the alteration is detected by the alteration detection;

display, if the execution of the execution module is restricted, a message indicating that the execution of the execution module is restricted with a button indicating at least one of a copy function and a scan function which are included in multi-function of the multi-function peripheral apparatus on a display of the multi-function peripheral apparatus; and display a menu indicating that the system of the multi-function peripheral apparatus is stopped, if the system of the multi-function peripheral apparatus is stopped, on the display of the multi-function peripheral apparatus.

11. The multi-function peripheral apparatus according to claim 10, wherein the executable instructions, when executed by the one or more processors, cause the multi-function peripheral apparatus to:

stop execution of the execution module after the alteration is detected by the alteration detection.

12. The multi-function peripheral apparatus according to claim 10, further comprising:

a Trusted Platform Module (TPM) as a tamper-resistant security chip, wherein the executable instructions, when executed by the one or more processors, cause the multi-function peripheral apparatus to:

detect the alteration of the execution module by using the TPM.

13. The multi-function peripheral apparatus according to claim 10, wherein the executable instructions, when executed by the one or more processors, cause the multi-function peripheral apparatus to:

detect the alteration of the execution module by using a hash value.

14. A method performed by a multi-function peripheral apparatus for performing alteration detection for an execution module, the method comprising:

detecting an alteration of the execution module;

stopping a system of the multi-function peripheral apparatus if the execution module is determined to be a predetermined type of module after an alteration is detected by the alteration detection;

restricting execution of the execution module and proceeding to operate the system of the multi-function peripheral apparatus if the execution module is not determined to be a predetermined type of module after the alteration is detected by the alteration detection;

displaying, if the execution of the execution module is restricted, a message indicating that the execution of the execution module is restricted with a button indicating at least one of a copy function and a scan function which are included in multi-function of the multi-function peripheral apparatus on a display of the multi-function peripheral apparatus; and displaying a menu indicating that the system of the multi-function peripheral apparatus is stopped, if the system of the multi-function peripheral apparatus is stopped, on the display of the multi-function peripheral apparatus.

* * * * *